(No Model.)
J. H. LOGAN.
SELF EMPTYING ICE SHREDDER.
No. 595,855.  Patented Dec. 21, 1897.
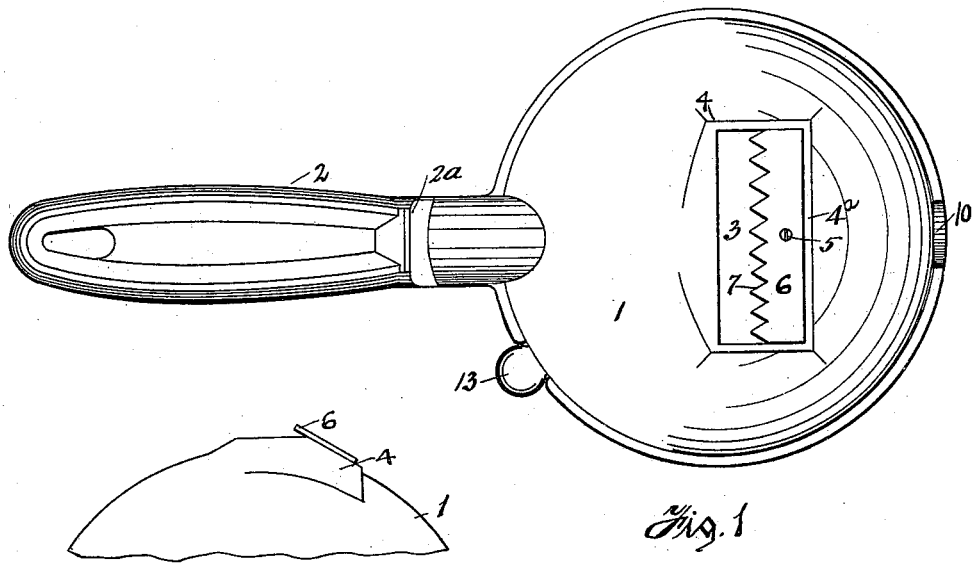
Fig. 1.
Fig. 3.
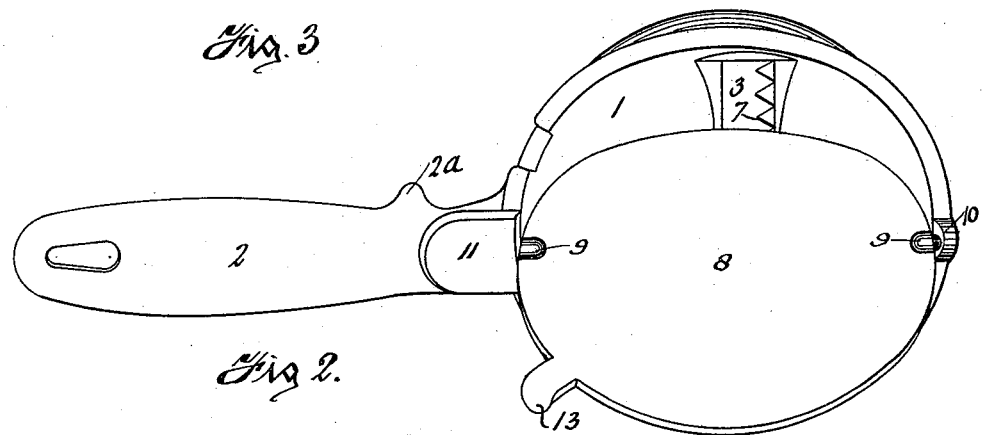
Fig. 2.
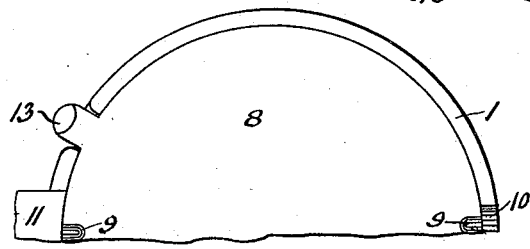
Fig. 4.
Witnesses
H. W. Middlemist
Edward A. Lawrence
Inventor
John H. Logan,
by Wm L. Pierce
his Attorney

UNITED STATES PATENT OFFICE.

JOHN H. LOGAN, OF ALLEGHENY, PENNSYLVANIA, ASSIGNOR TO THE LOGAN & STROWBRIDGE IRON COMPANY, OF NEW BRIGHTON, PENNSYLVANIA.

SELF-EMPTYING ICE-SHREDDER.

SPECIFICATION forming part of Letters Patent No. 595,855, dated December 21, 1897.

Application filed April 20, 1897. Serial No. 632,992. (No model.)

*To all whom it may concern:*

Be it known that I, JOHN H. LOGAN, a citizen of the United States, residing at Allegheny, in the county of Allegheny and State of Pennsylvania, have invented or discovered new and useful Improvements in Self-Emptying Ice-Shredders, of which the following is a specification.

In the accompanying drawings, which make part of this specification, Figure 1 is a bottom plan view of my invention. Fig. 2 is an isometrical view thereof, showing the cover partially reversed. Fig. 3 is a broken side elevation of my device, and Fig. 4 is a broken plan view thereof.

My invention, briefly stated, is an improved ice-shredder, consisting of a vessel provided with a shredding-blade adjacent to an opening in the bottom thereof and a pivoted cover fitted to reverse and empty the vessel of shredded ice.

The following is a detailed description of my device:

1 is a vessel preferably hemispherical in shape, and 2 is a handle integral therewith.

$2^a$ is a projection on the under side of the handle near its base, providing an effective grip.

3 is a transverse slot in the bottom of vessel 1, and 4 is an integral combing about said slot 3, the side of which farthest from the handle 2 is inclined on its outer face, preferably at an angle of about thirty-five degrees to the horizontal, forming blade-bed $4^a$. On blade-bed $4^a$ is secured by set-screw 5 or other suitable means blade 6, whose lower or cutting edge, which projects beneath slot 3, is preferably serrated, as at 7.

8 is a cover of similar contour, but of slightly less diameter than the rim of vessel 1.

9 9 are journals diametrically opposite each other on the periphery of cover 8, one of whose bearings is formed by a perforated lug 10 on the rim of vessel 1 and the other between the base of handle 2 and plate 11, secured to said handle.

13 is a thumb-piece by means of which cover 8 may be reversed and which also forms a support for the cover when in place.

The operation of my device is as follows: The shredder is placed upon a cake of ice and the handle raised or lowered, accordingly as finely or coarsely shredded ice is desired. The shredder is then drawn along over the ice, the blade shredding the same. The shredded product passes up through the slot into the interior of the vessel, whence it is removed by reversing the cover, which acts as a scraper to force out the contents of the vessel.

Having described my invention, what I claim is—

1. In ice-shredders, the combination of a vessel; an opening in the bottom of said vessel; a cutting-surface adjacent to said opening and a reversible cover for said vessel.

2. In ice-shredders, the combination of a vessel; an opening in the bottom of said vessel; a combing about said opening, one side of said combing being inclined; a serrated blade mounted on said inclined side, and projecting beneath said opening, and a cover of less diameter than the rim of said vessel, journaled in said rim and capable, by its reversal, of emptying said vessel.

3. In ice-shredders, the combination of a semispherical vessel; an opening in the bottom of said vessel; an inclined blade projecting beneath said opening, and a circular cover of less diameter than said vessel, journaled in the rim of said vessel and capable of reversal.

In testimony whereof I have hereunto set my hand this 19th day of April, A. D. 1897.

JOHN H. LOGAN.

Witnesses:
C. C. LEE,
EDWARD C. LAWRENCE.